(No Model.)
A. GILLIES.
WHEEL.
No. 401,551. Patented Apr. 16, 1889.
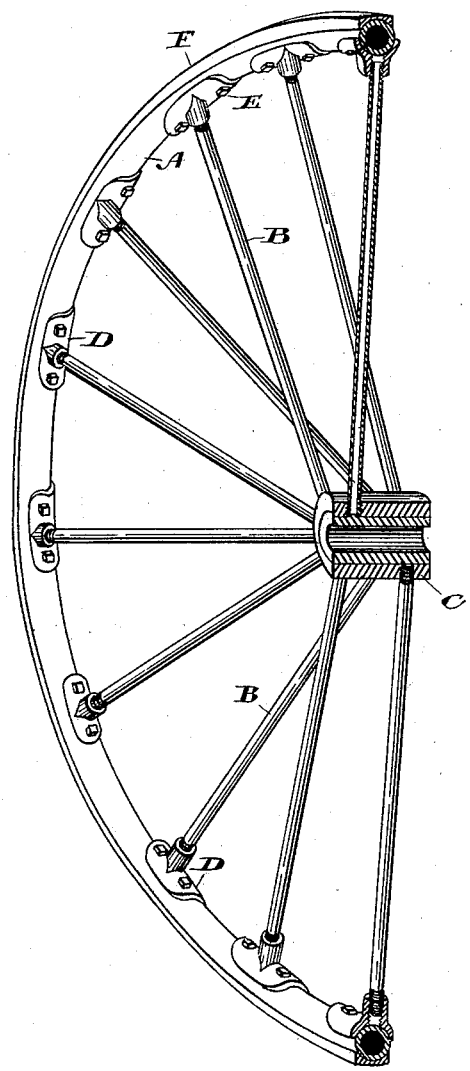
Witnesses.
F. B. Featherstonhaugh
Chas. H. Riches
Inventor:
Alexander Gillies
by Donald C. Ridout & Co
Attys

UNITED STATES PATENT OFFICE.

ALEXANDER GILLIES, OF WEST TORONTO JUNCTION, ONTARIO, CANADA.

WHEEL.

SPECIFICATION forming part of Letters Patent No. 401,551, dated April 16, 1889.

Application filed September 1, 1888. Serial No. 284,354. (No model.)

*To all whom it may concern:*

Be it known that I, ALEXANDER GILLIES, mechanic, of the village of West Toronto Junction, in the county of York, in the Province of Ontario, Canada, have invented a certain new and useful Improvement in Wheels, of which the following is a specification.

The object of the invention is to design an exceptionally-strong wheel from the lighest possible material; and it consists, essentially, in forming the rim out of a light metal tube secured to the hub of the wheel by means of light metal tubular spokes, the outer ends of the tubular spokes being connected to the rim by metal clips shaped to fit the surface of the rim, to which they are secured by screws.

The figure is a perspective sectional view of my improved wheel.

A represents the rim, which is formed of a light tube.

B represents the spokes, which are made of light metal tubes screwed into and radiating from the hub C.

D represents metal clips shaped to fit the surface of the rim A, to which they are secured by means of the screws or bolts E.

F is the tire, which is shaped to fit the surface of the rim A.

I of course heat the tire F and then shrink it onto the rim. It will be noticed that a wheel made in this manner, being entirely composed of tubular material, will be exceedingly strong in its construction, and at the same time will be very light in proportion to its strength. It will also be observed that the wheel may be put together by any ordinary mechanic, as its parts are so simply arranged and easily put together that an unskilled person will find no difficulty in putting it together.

I am aware that it has been proposed to construct a wheel with a tubular felly and metallic sockets forming portions of the spokes, and I am also aware that tubular spokes are not new, broadly.

What I claim as my invention is—

1. As a new article of manufacture, a wheel composed of the hub C, formed of two concentric tubes, a metal tubular frame, A, and tubular spokes B, the latter being screwed into the outer tube of the hub C, and connected at their opposite ends to the rim A by means of the clips D, substantially as and for the purpose specified.

2. The wheel described, consisting of a tubular metal frame or felly, A, the clips D, shaped to fit said felly and provided with screw-threaded sockets, the tire shaped to fit the felly, the hub, and the tubular spokes B, screwed directly into said hub at one end, and at the other end into said socket, substantially as shown and described.

Toronto, July 30, 1888.

ALEX. GILLIES.

In presence of—
CHARLES C. BALDWIN,
CHAS. H. RICHES.